Dec. 2, 1941.  E. A. SLYE  2,264,557
COUNTER MECHANISM
Filed March 21, 1934   10 Sheets-Sheet 1
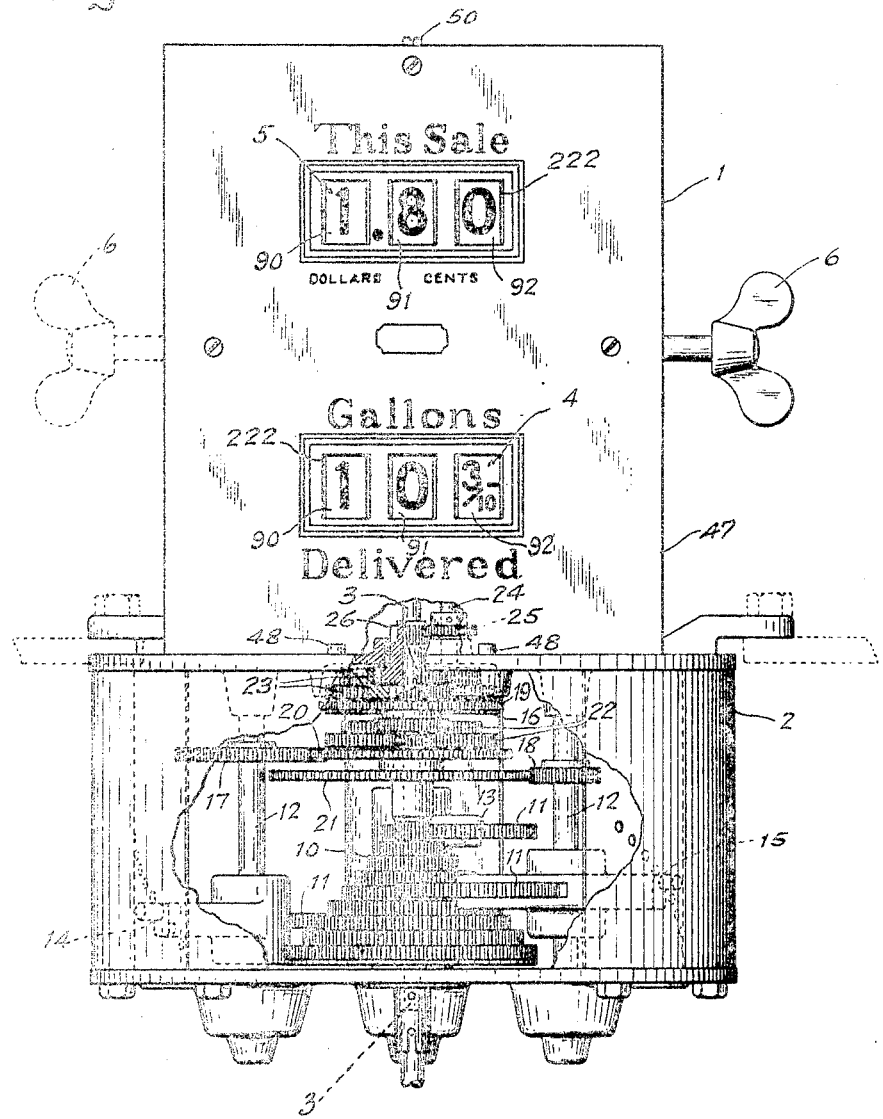
INVENTOR
EDWARD A. SLYE
BY
ATTORNEY.

Dec. 2, 1941.  E. A. SLYE  2,264,557
COUNTER MECHANISM
Filed March 21, 1934   10 Sheets-Sheet 2
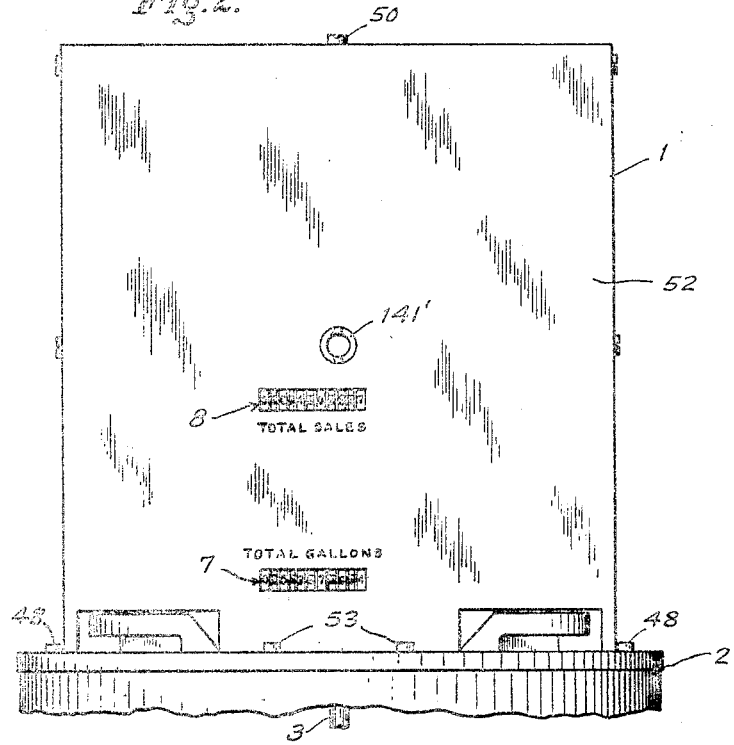
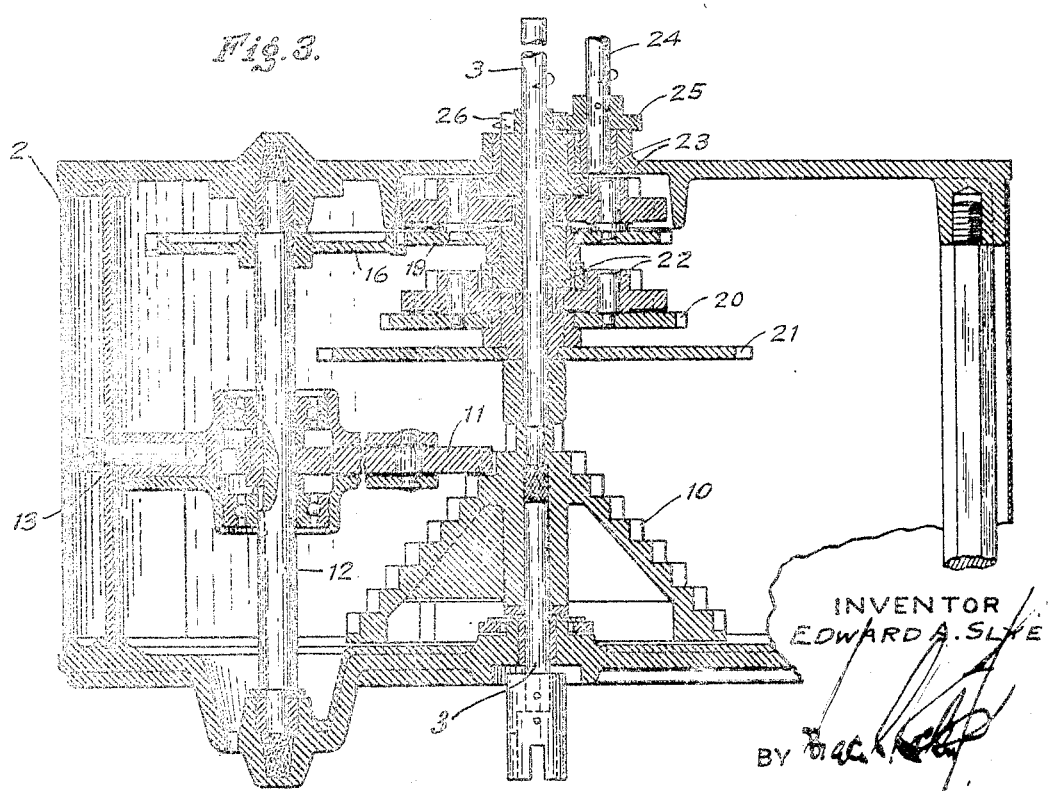
INVENTOR
EDWARD A. SLYE
BY
ATTORNEY.

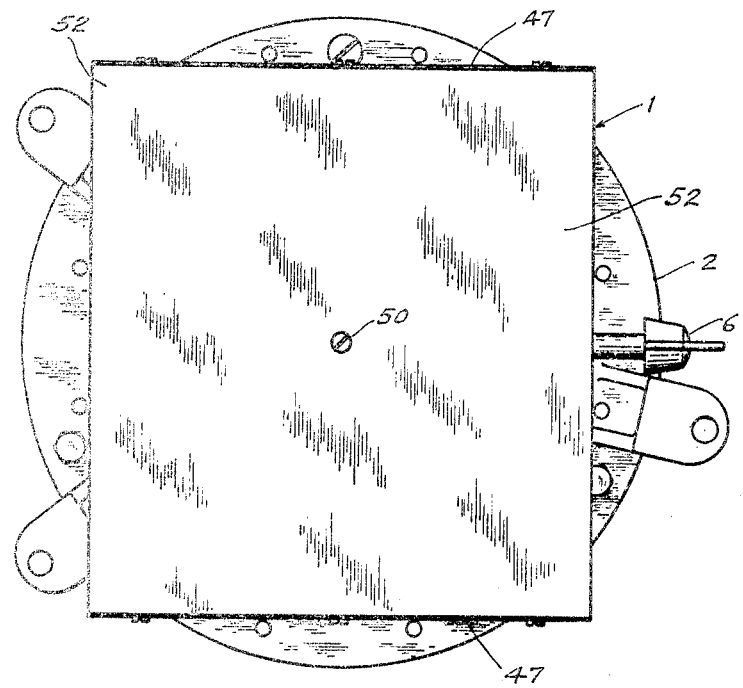
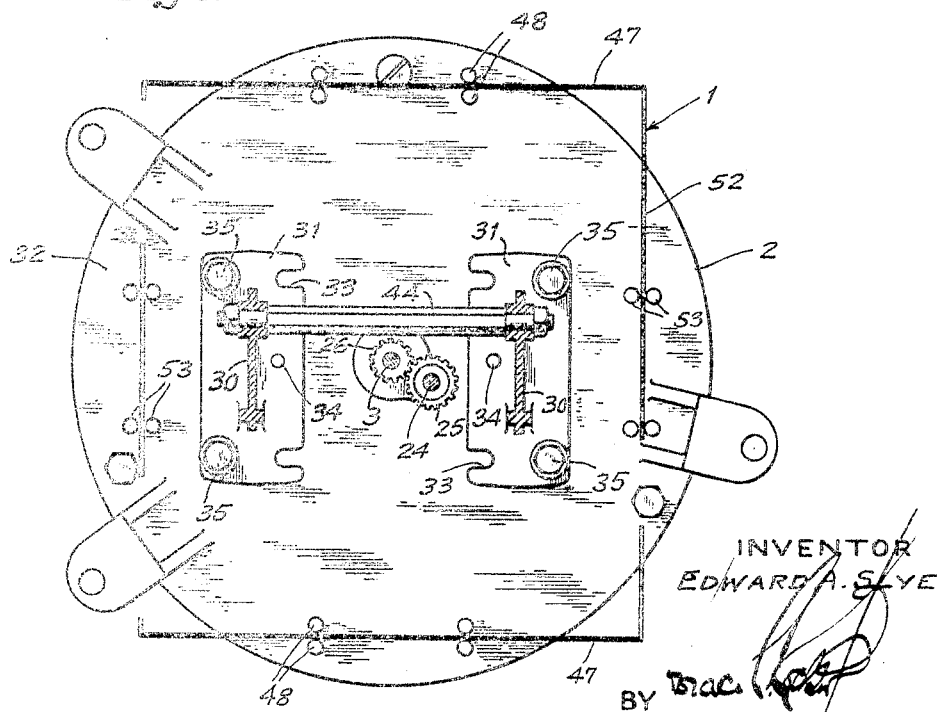

INVENTOR
EDWARD A. SLYE
BY
ATTORNEY.

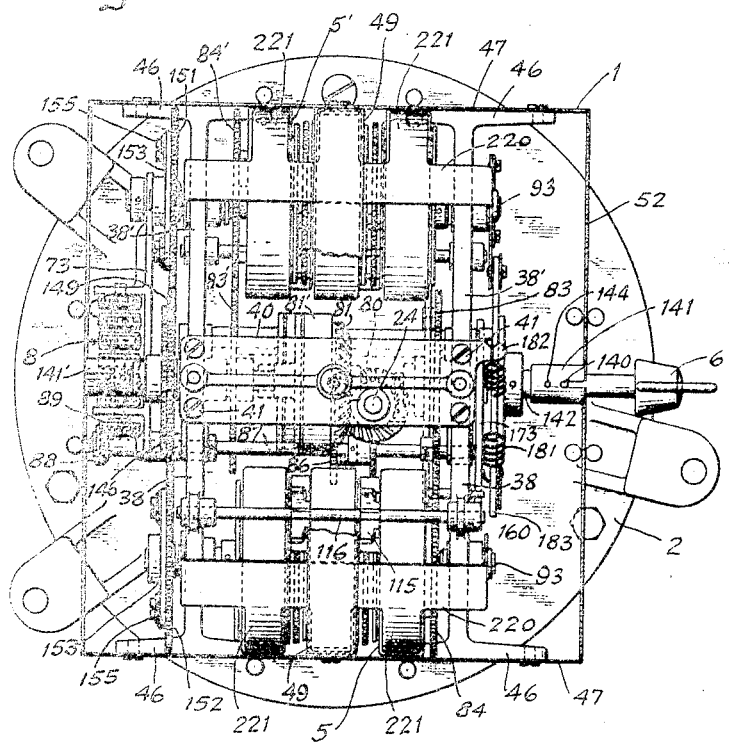

Dec. 2, 1941. E. A. SLYE 2,264,557
COUNTER MECHANISM
Filed March 21, 1934 10 Sheets-Sheet 6

INVENTOR
EDWARD A. SLYE
BY
ATTORNEY.

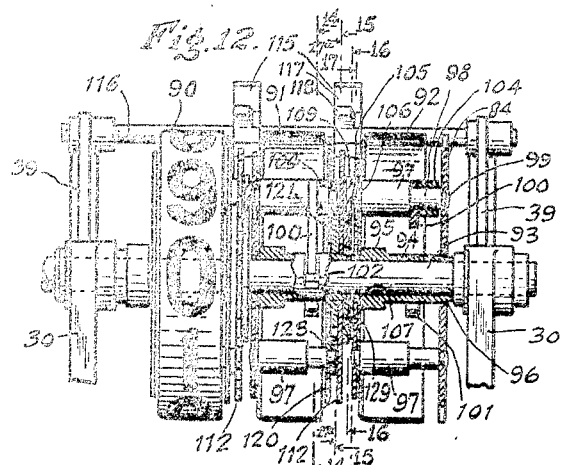
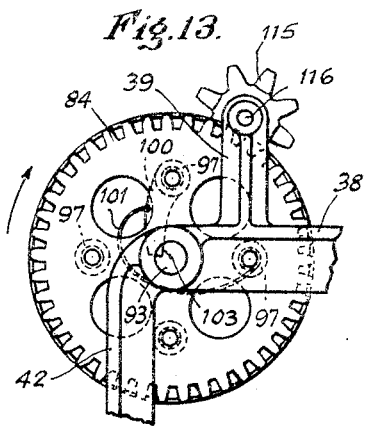
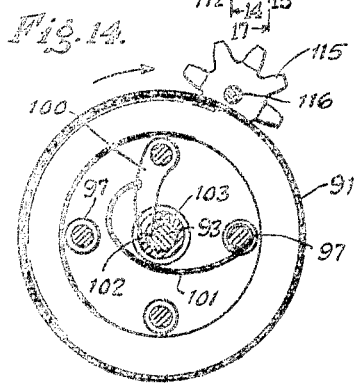
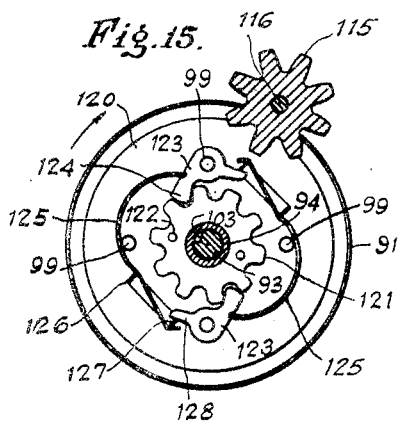
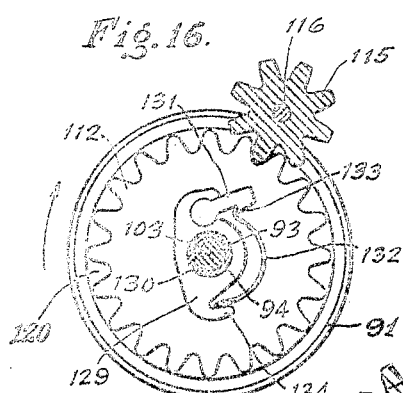
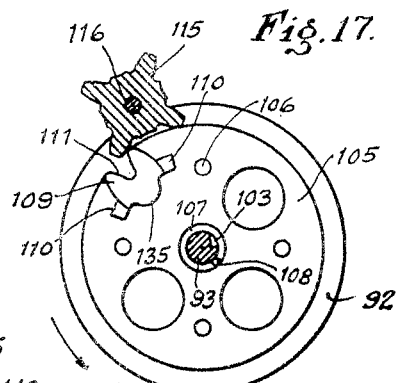
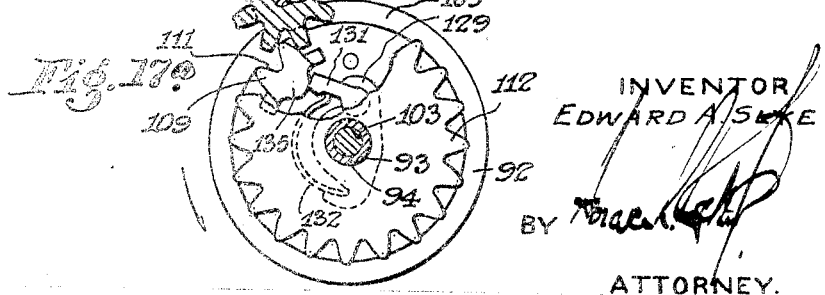

Dec. 2, 1941.                    E. A. SLYE                    2,264,557
                             COUNTER MECHANISM
                          Filed March 21, 1934          10 Sheets-Sheet 8
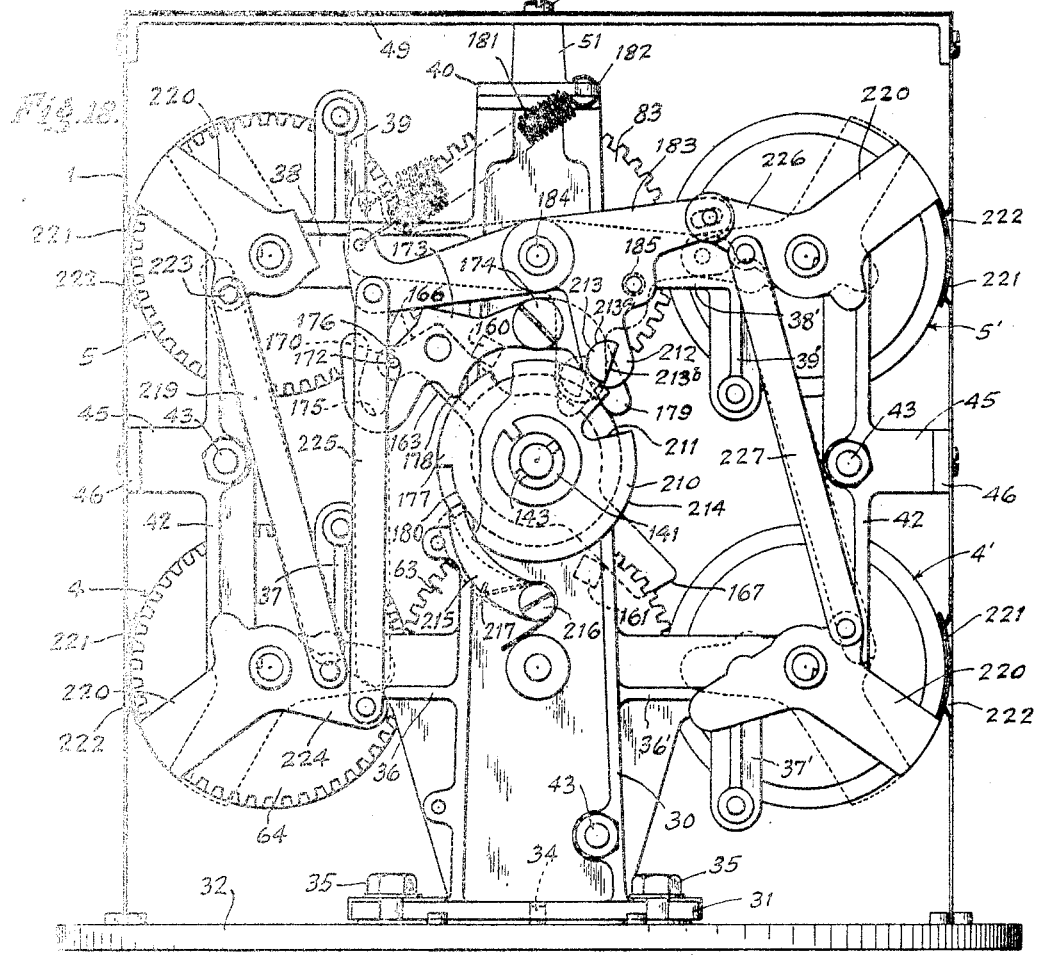
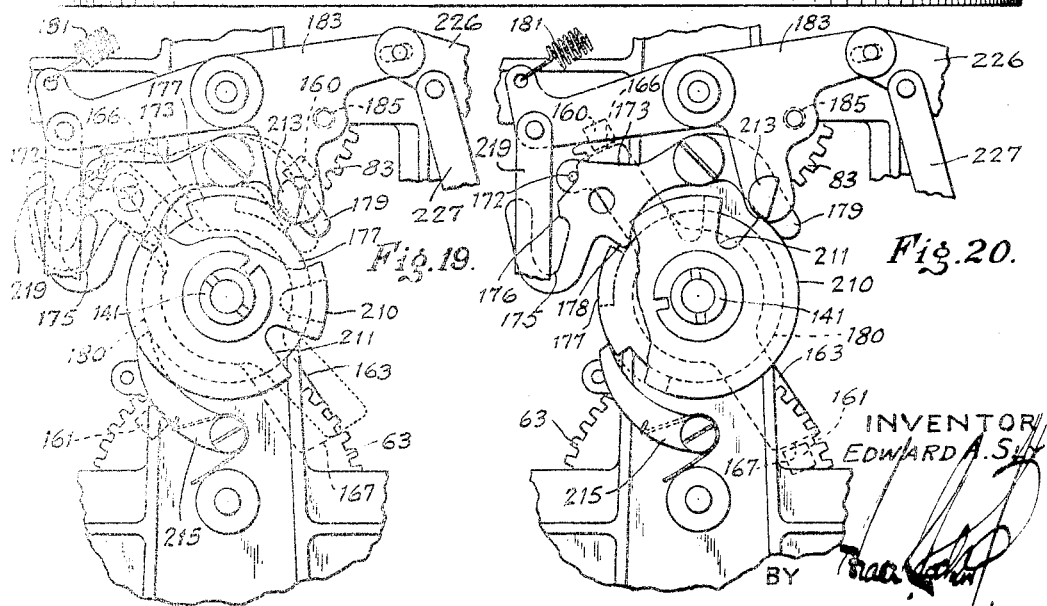
INVENTOR
EDWARD A. SLYE
BY
ATTORNEY.

Dec. 2, 1941.  E. A. SLYE  2,264,557
COUNTER MECHANISM
Filed March 21, 1934    10 Sheets-Sheet 9
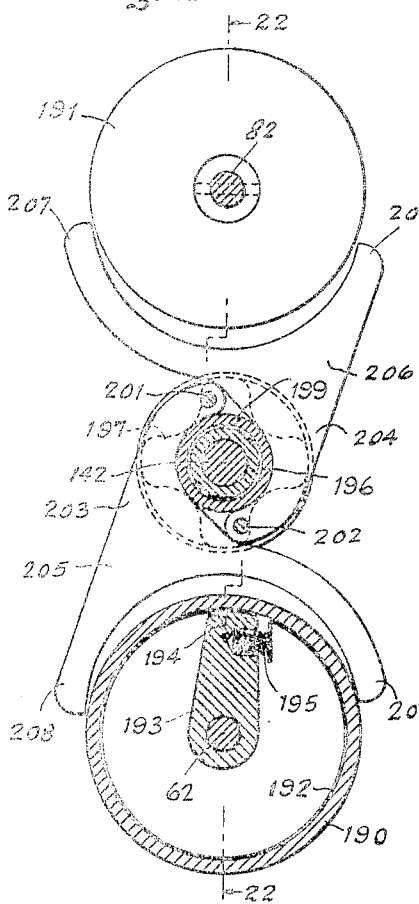
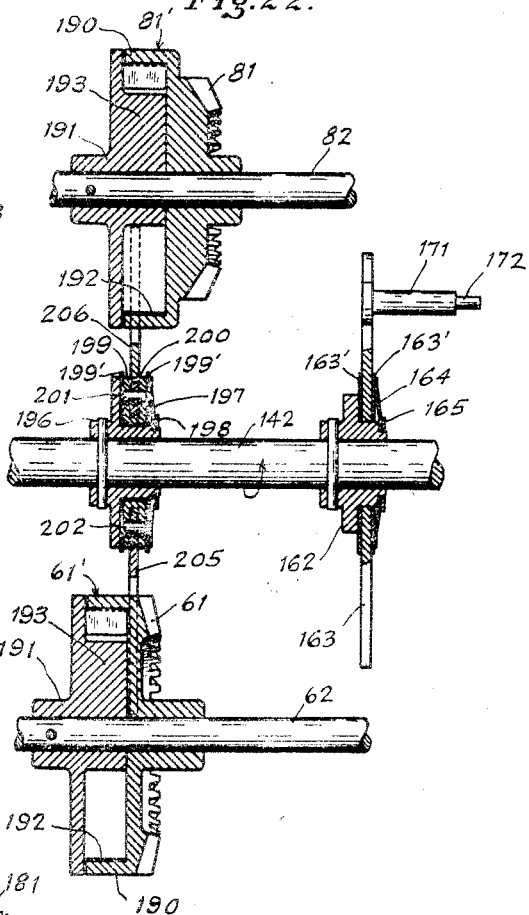
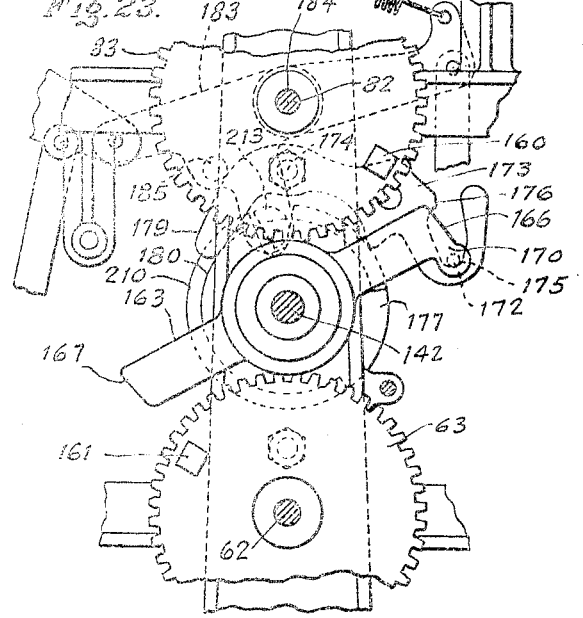
INVENTOR
EDWARD A. SLYE
BY
ATTORNEY.

Dec. 2, 1941.   E. A. SLYE   2,264,557
COUNTER MECHANISM
Filed March 21, 1934   10 Sheets-Sheet 10

INVENTOR
EDWARD A. SLYE
BY
ATTORNEY.

Patented Dec. 2, 1941

2,264,557

UNITED STATES PATENT OFFICE 2,264,557

COUNTER MECHANISM

Edward A. Slye, East Hartford, Conn., assignor to Veeder-Root Incorporated, a corporation of Connecticut Application March 21, 1934, Serial No. 716,696

40 Claims. (Cl. 235—144)

My invention relates to counter mechanisms.

It has among its objects to provide an improved counter mechanism, and, more particularly, to provide an improved construction and arrangement of counter mechanism adapted to register both the quantity and cost of a material being dispensed, as for example gasoline or the like. A further object of my invention is to provide an improved quantity and cost counter mechanism especially adapted to co-operate with a liquid quantity meter of the type used in filling station pumps and with a change speed mechanism or cost variator, herein of the general construction described and claimed in my co-pending application, Serial No. 628,863, filed August 15, 1932. A still further object of my present invention is to provide such an improved counter mechanism, operative by a meter shaft and by such an adjustable variator, for accurately registering the output of the pump in gallons, and also accurately registering the cost of any selected output in dollars and cents, irrespective of changes in price per gallon determined by the setting of the adjustable variator and irrespective of inaccuracies incident to the use of a meter and variator in the combination set forth. Another object of my invention is to provide improved co-operating, controlling, and resetting means for such a counter co-operating with the latter and with the meter drive and the variator in such manner as to enable an accurate count to be obtained during liquid flow and despite resetting. Another object is to enable the counter mechanism to be quickly and conveniently reset while protecting the counter from fraudulent manipulation of the resetting mechanism to vary the count. Other objects of my invention include the provision of an improved construction and arrangement of counters including counter units of an improved construction and having improved stop means for preventing overthrow of the counter wheels, improved driving connections for said units and counters including improved brake mechanism for insuring accuracy of count and preventing errors due to backlash in the drive from the meter and variator, improved resetting mechanism for the counters operative to reset all of the counters upon a single revolution of a single operating member, improved shutter mechanism and co-operating reset controlling mechanism for preventing fraudulent manipulation of the resetting mechanism, improved means co-operating with the stop means aforesaid for preventing overthrow of the counter wheels upon rapid manipulation of the resetting mechanism, and improved totalizing counter means which are also free from error in the count due to backlash. These and other objects and advantages of my improved construction will, however, hereinafter more fully appear.

In the accompanying drawings, I have shown for purposes of illustration certain embodiments which my invention may assume in practice, the same being illustrated in connection with a variator of the construction of my application aforesaid, although it will be understood that my counter, while especially adapted to use in connection with this particular variator construction, is not limited to use in connection therewith.

In these drawings,

Figure 1 is a front elevation of my improved counter mechanism associated with the meter driven variator aforesaid in such manner as progressively to register, as indicated, both the output of the pump and the cost of said output, certain parts of the counter and variator casings being broken away to facilitate illustration;

Figure 2 is an elevation of the left hand end of the counter casing shown in Fig. 1, showing the totalizing gallon and cost counters and the drive socket connection for the reset member, the variator being omitted;

Figure 3 is a vertical sectional view of the variator mechanism, the counter being omitted;

Figure 4 is a top plan view of the counter;

Figure 5 is a sectional view on line 5—5 of Fig. 6;

Figure 8 is a top plan view similar to Fig. 4, but with the casing removed to show the mechanism, this view showing the double arrangement of the mechanism suitable for use with a usual type of pump readable from front or back;

Figure 9 is a transverse sectional view on line 9—9 of Figure 6, certain parts being shown in elevation to facilitate illustration;

Figure 12 is an elevation partially in vertical section of one of the counters, two of the counter units therein being in section;

Figure 13 is an end elevation of the structure shown in Fig. 12;

Figure 14 is a section on line 14—14 of Fig. 12;

Figure 15 is a section on line 15—15 of Fig. 12;

Figure 16 is a section on line 16—16 of Fig. 12;

Figure 17 is a section on line 17—17 of Fig. 12;

Fig. 17a is a sectional view on line 17a—17a of Fig. 12, certain parts being broken away to show the relation of adjacent units in zero position;

Figure 18 is an enlarged view of the mechanism shown in Fig. 6, the parts being in the "first click" position occupied during resetting and the shutters also being shown in full and dotted line positions;

Figure 19 is an enlarged detail of the central portion of the mechanism shown in Fig. 18, the same being shown in dotted lines in the "second click" resetting position and in full lines in the "third click" position;

Figure 20 is a view similar to Fig. 19, but with the parts shown in dotted lines in the "ninth click" position and in full lines in the position occupied just before they return to the counting position shown in Fig. 6;

Figure 21 is an enlarged sectional view on line 21—21 of Fig. 11 showing the reset shaft and one of the clutch members in section;

Figure 22 is a section on line 22—22 of Fig. 21, the control pin supported on the main reset shaft being illustrated and with its support on said shaft in section;

Figure 23 is a section on line 23—23 of Fig. 11, showing the mechanism of Figs. 19 and 20 from the opposite side, but with position of parts as in Fig. 6;

Figure 6:
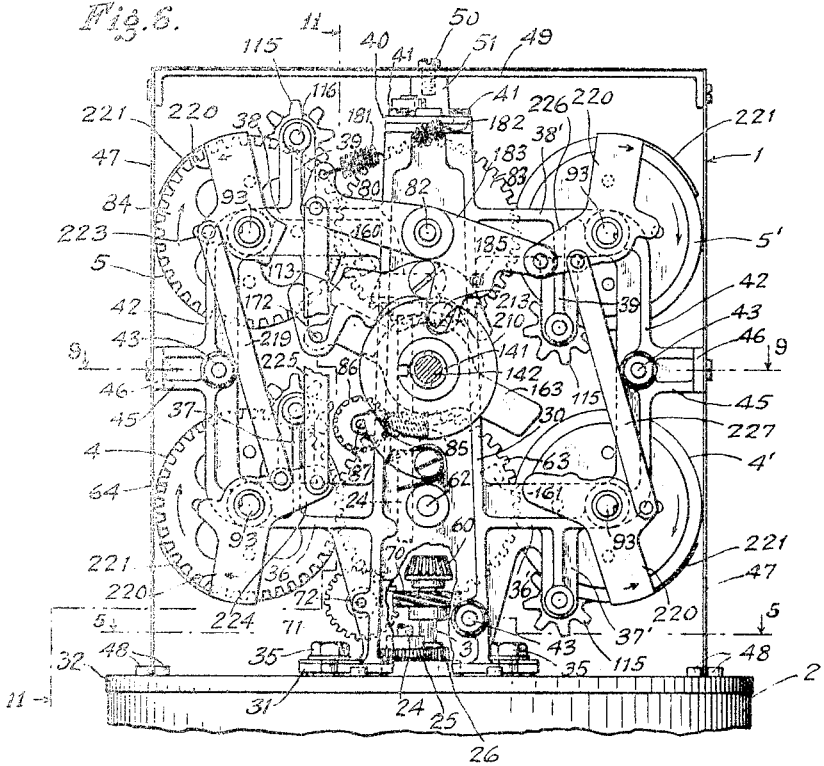
Figure 6 is an elevation of the right hand side of the counter shown in Fig. 1, the casing being removed to expose the mechanism and certain parts being broken away to facilitate illustration.

In the illustrative construction shown in Figures 1 to 25, it will be noted that the same comprises a counter mechanism enclosing in a casing 1 and disposed above a variator enclosed in a casing 2, and driven both by the variator and a meter shaft 3 which drives the variator and is in turn driven by any usual pump meter (not shown).

Referring generally to the counter mechanism enclosed in the casing 1, it will further be noted that the same includes a plurality of sets of improved "gallon" and "money" counters, generally indicated at 4, 4' and 5, 5', respectively, and adapted, respectively, to register progressively throughout each filling operation the number of gallons passing through the meter and the cost of the same at the price determined by the setting of the variator mechanism at the time. Moreover, this counter mechanism herein also includes improved resetting mechanism adapted to reset the counter mechanism at the end of each filling operation and having an operating member 6; while it also includes totalizing counters, generally indicated at 7 and 8, which totalize, respectively, the number of gallons dispensed and cost thereof. This counter mechanism, including the above features, is of an improved construction and includes other improved controlling and resetting mechanism cooperating with the meter and variator in an improved manner to provide both accurate transactions and total counts, all as hereinafter more fully described.

As the meter and the variator mechanism operate in such manner as to present definite counter problems, the variator mechanism will first be generally described, a specific description of the same being believed to be unnecessary in view of my prior application aforesaid. Herein, however, it will be noted that the same includes a pyramidal series of spur gears 10 (Figs. 1 and 3) coaxial with and rotatable as a unit in one direction by the meter shaft 3 and a plurality of series of co-operating price determining gears 11 meshing with selected gears 10 and adjustable on shafts 12 into different vertical positions representing different prices per gallon. Three sets of these gears 11 are shown, which are adapted to be adjusted for variations of one-tenth in pin and hole connections 13, 14 and 15, i. e. to indicate variations of ten cents, of a single cent, and of tenths of a cent, respectively. Moreover, it will be noted that, as in my application mentioned, the upper ends of the shafts 12 carry gears 16, 17 and 18 of different diameter which respectively mesh with gears 19, 20 and 21 disposed coaxially on the upper end of the meter shaft 3. Also, as therein, two sets of operatively connected differential planetary gearing, generally indicated at 22 and 23 and including usual sun gears and co-operating planetary systems rotatable independently of the sun gears with gears 19 and 20, are respectively disposed between the gears 19 and 20 and above the gear 19, and act to rotate a cost or "money" counter shaft 24, which projects up into the bottom of the casing 1, and is rotated thereon by a gear 25 and a gear 26 which is rotatable on the meter shaft 3 by the planetary mechanisms mentioned. Thus, with a pin and hole adjustment of the parts 13, 14, 15 calling for a price of any selected odd or even number of cents per gallon, or any even or odd number plus any selected number of tenths, as for examples, eleven and one-tenth, sixteen and two-tenths, or twenty and nine-tenths, the meter shaft 3 will always rotate at the same constant speed determined by the drive of the pump, while the shaft 24 will rotate in the same direction as the shaft 3 but at different constant speeds determined by the price setting of the variator pin and hole connections 13, 14, 15 then in use.

All of the counter mechanism, including the lower pair of gallon counters 4, 4', visible from opposite faces of the casing 1, the upper pair of cost or money counters 5, 5', similarly visible, and also the gallon totalizer 7 and cost or money totalizer 8, both of which are visible from the casing end opposite the resetting member 6, are driven from these two shafts 3 and 24, while both gallon counters 4, 4', and both money counters 5, 5', are reset by the resetting member 6, independently of the totalizing counters 7 and 8 which merely totalize the amounts successively registered on the counters 4 and 5 in the several filling operations.

Referring more particularly to the mounting of the counters in the casing 1, it will be noted that a frame is provided therein in the form of a pair of upstanding frame members 30. Here, it will also be noted that each of these frame members 30 is of the same construction and that the same are laterally spaced apart in such manner as to support the several gallon and money counters 4, 4' and 5, 5' therebetween, while having the counter driving mechanism, connected to the shafts 3 and 24, and hereinafter described, extend upward between the gallon and money counters on one face of the casing and the gallon and money counters disposed on the other, while the controlling mechanism operated by the member 6 and likewise hereinafter described, is also suitably supported on these frame members between these sets of vertically disposed counters, as shown in Fig. 6.

Each of these frame members herein has a laterally extending foot 31 (Fig. 5) thereon seated on the top plate 32 of the variator casing 2 and a series of slots 33 in each foot including a central hole adapted to receive an upstanding locating pin 34 and end slots adapted to receive clamping bolts 35. Herein, it will also be noted that each frame member 30 is provided with a pair of lower laterally and oppositely extending arms 36, 36' (Fig. 6) on the ends of which the gallon counters 4, 4' are mounted, as hereinafter described, while oppositely extending transfer pinion supports 37, 37' are also provided on these arms 36, 36', the support 37 for the left hand counter 4 extending upward, as shown in Fig. 6, and support 37' for the right hand counter 4' extending downward, as shown in that figure. Further, it will be noted that similar arms 38, 38' having similar transfer pinion supports 39, 39' are provided adjacent the top of the frame members 30 for the spaced money counters 5, 5'. Attention is further directed to the fact that the two frame members 30 are connected at their top by a cross connection 40 (Fig. 8) suitably attached at its opposite ends to each of the same, as by screws 41; the upper end of the shaft 24 also being suitably journaled in this cross connection. It will also be noted that the sets of arms 36—36' and 38—38' are connected vertically at their ends by upstanding webbed members 42, which in turn are connected by bolts 43 and spaced by spacing sleeves 44 (Fig. 9) formed on said bolts, while a like connection 43, 44 is provided between the bottoms of the members 30.

It will also be observed that the casing 1 is carried by the counter frame members 30. Herein, each of the portions 42 is provided with a lateral extension 45, (Fig. 6) which is in turn provided at right angles thereto with an elongated casing carrying portion 46 to which two, preferably identic, front and rear face members or plates 47 of the casing 1, suitably apertured to expose the counters 4, 4' and 5, 5' are suitably attached. As shown in Fig. 5, the lower ends of these plates 47 are also passed between spaced upstanding lugs 48 on the variator top plate 32. Also the two plates 47 are connected at their tops, as by screws, to the ends of a cross member 49, (Fig. 6) suitably attached as by a screw 50 to the top frame connection 40, preferably at the top of a raised spacing lug 51 on the latter. Here it will also be noted that the remainder of the casing 1 is in the form of a single U-shape cover member 52, likewise attached to the connection 40 and having one side portion suitably apertured to expose the counters 7 and 8, and both side portions suitably apertured to expose the ends of the reset shaft, hereinafter described, while also having a connecting cover portion supported on the member 49 and attached thereto by the screw 50, and the lower ends of the side portions seated between spaced lugs 53 similar to lugs 48. Thus, it will be noted that access to the internal mechanism may be had by simply removing the screw 50 and lifting off the member 52, and that the members 47 may also be removed when desired.

The several counters driven by the shafts 3 and 24, being arranged and supported as described, attention is next directed to the driving connections between these shafts and the counters. Here it will be noted that these driving connections divide into two drives, one driven by the meter shaft 3 and actuating the two lower gallon counters 4, 4', and the other driven by the variator driven cost or money counter shaft 24 and actuating the two upper cost or money counters 5, 5'.

Figure 11:
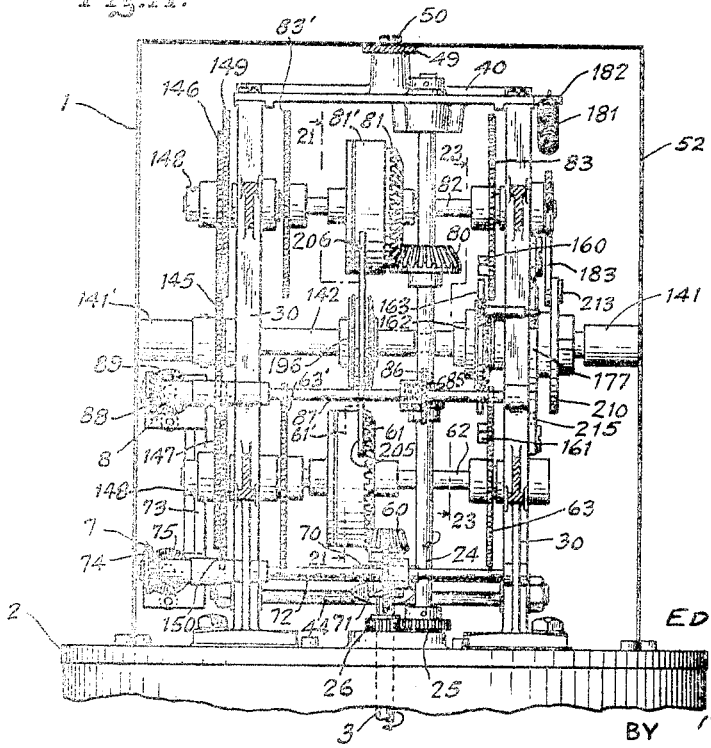
Figure 11 is a sectional view on line 11—11 of Figure 6.
Figure 24:
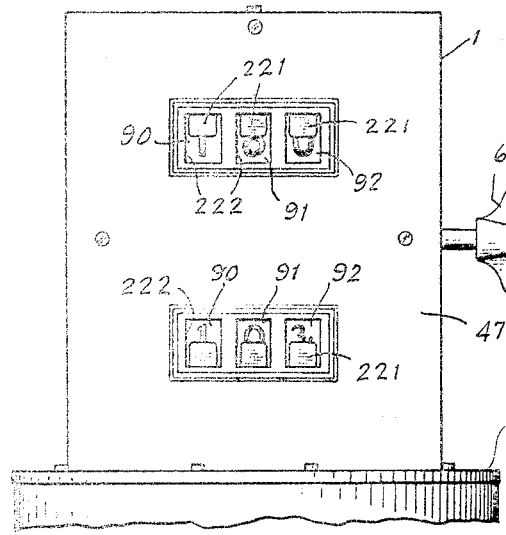
Figure 24 is a reduced side elevation of the upper counter casing of Fig. 1, showing the shutters in process of movement toward closed position and in the position occupied after slack is taken up in resetting and prior to the "first click" position.
Figure 25:
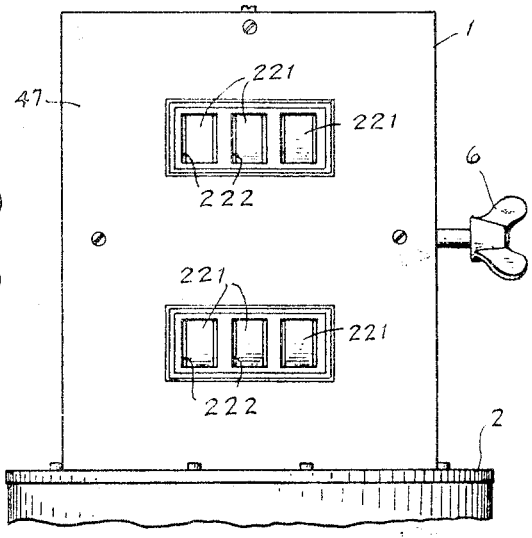
Figure 25 is a similar view with the shutters closed, i. e. in the position occupied thereby from the "first click" until the completion of resetting.

Referring first to the drive for the gallon counters 4, 4', it will be noted that a bevel pinion 60 is carried on the upper end of the shaft 3 at a point below the arms 36, 36' on the frame members 30 and midway between these arms, as shown in Fig. 6. This pinion 60, as shown in Fig. 11, meshes with a bevel gear 61 disposed coaxially with a transverse shaft 62, suitably journaled at its opposite ends in the frame members 30, and drives that shaft through a clutch 61', hereafter described. Further, it will be noted that coaxially disposed counter driving spur gears 63, 63' of substantially larger diameter than the bevel gear 61, are fixed to opposite ends of this shaft 62 within the frame members 30, so that on rotation of the gearing 60, 61, these gears 63, 63' will be rotated. Moreover, it will be noted that one of these gears 63 meshes with a correspondingly toothed gear 64 which forms the driving gear for the left hand counter 4, as shown in Fig. 9, while the other gear 63' meshes with a corresponding gear 64' which drives the right hand lower gallon counter 4' from a point nearer the opposite end of the shaft 62. Thus, during dispensing of liquid by the pump, the two gallon counters 4, 4' will be rotated in such manner that, viewed from the right hand end, as in Fig. 6, the counter wheels 4, 4' will be rotated, as indicated in that figure, the higher figures coming up from beneath on the left hand counter 4, and down from the top on the right hand counter 4'.

Operatively connected to the shaft 3 is also the drive for the gallon totalizing counter 7. As shown in Fig. 11, this drive includes a worm 70, fixed to the shaft 3 below the bevel pinion 60, which meshes with a worm gear 71 suitably fixed to a transverse shaft 72 which is, in turn, suitably journaled in the frame members 30 and a supplementary totalizer counter bracket 73 carried outside the left hand counter frame member 30. As shown, this shaft 72 also has a bevel pinion 74 on its outer end meshing with a co-operating bevel gear 75 on the shaft of the counter 7. Herein, this counter is of a usual non-reset multiple wheel type adapted to begin to count again at zero after counting a total of 999,999 gallons in successive dispensing operations; this being a simple and inexpensive form of counter well adapted to the requirements of the average filling station, and also of a type which, eliminating need for manual resetting and requiring removal of the casing and taking down of the counter in order to change the counter reading, presents little opportunity for tampering.

Next referring to the drive of the cost or money counters 5, 5', it will be noted that, while these counters are driven by the shaft 24, the connections for driving the same are essentially similar to those for the gallon counters 4, 4' previously described. More particularly, it will be observed that a bevel pinion 80 (Fig. 11) is fixed to the shaft 24 below the axes of the counters 5, 5' and between the same, and that this pinion meshes with a larger bevel gear 81, similar to the gear 61. The gear 81, in turn, rotates, through a clutch 81' hereinafter described, a transverse shaft 82 having spur gears 83, 83' (Fig. 8) fixed near opposite ends thereof and, respectively meshing with co-operating spur gears 84, 84' at the opposite ends of the counters 5 and 5', respectively, to drive the same in the same general manner as the counters 4, 4'. Thus, it will be noted that the counter wheels of the counters 4, 5, visible from one face of the casing, will move upward during counting, while the wheels on the counters 4', 5', visible from the opposite face, will move downward during counting.

The money totalizing counter 8 is also connected to the shaft 24 similarly to the connection of the gallon totalizer 7 to the shaft 3 previously described. Here, a worm 85 (Fig. 11) is fixed to the shaft 24 below the pinion 80 and the axis of the reset member 6, and this worm meshes with a worm gear 86 on a transverse shaft 87, journaled in the frame members 30 and totalizer bracket 73, at the top of the latter. Further, this shaft, in turn, carries on its outer end a bevel pinion 88 meshing with a like bevel gear 89 driving the money totalizer counter 8, which counter is also preferably of the same type as the counter 7 and similarly enclosed within the casing.

The location of the several counters 4, 4', and 5, 5', at the corners of the rectangular frames provided by the frame members 36, 36', 38, 38' and 42, and the drive of the several counters, being determined, attention is next directed to the construction of these counters. Here, it will be noted that, apart from their drives at different ends of the mechanism and the reverse arrangement of the numerals on the wheels 4, 5 and 4', 5', each of these counters is of the same construction. Thus, a detailed description of one of the same will suffice for all, references being here had to Figs. 12 to 17a inclusive. As indicated in these figures, in which the counter 5 is illustrated as an example, it will be noted that each counter comprises a plurality of operatively connected number wheel units, 90, 91, and 92, arranged coaxially on a supporting and resetting shaft 93 suitably journaled at its ends in the frame members 30. As illustrated, these wheels are numbered to indicate dollars and cents up to $9.99 in each of the money counters, and gallons and tenths of gallons up to 99.9 gallons in each of the gallon counters. Further, it will be noted that each counter unit is of substantially larger diameter than the average counter, in such manner as to permit the use of large readily readable numbers on the number wheels, and that each counter unit is also of a quite light construction, comprising parts of a light material, such, for example, as aluminum, in such manner as to minimize the problems arising from the large size of the same.

Referring more in detail to the right hand wheel 92 shown in Fig. 12 and its associated mechanism, note that this wheel is fixed to and rotates with a sleeve 94 which is, in turn, seated on the shaft 93 and projects beyond the opposite sides of the wheel 92, while having a shoulder 95 abutting the inner periphery of a suitably axial aperture in the wheel. As shown herein, this sleeve 94 is also provided with a reduced portion 96 on its longer projecting end on which is fixed the spur gear 84 heretofore described. It will moreover be noted that a series of spaced studs 97, herein four, is suitably staked within the left hand wall of the wheel 92 as shown in Fig. 12, and projects therefrom parallel to the sleeve 94, each stud herein being provided with reduced portions 98 and 99 on its free end, of which the portion 99 at the extremity of the stud is of smaller diameter than the portion 98. On one of these portions 98, a reset pawl 100 is pivotally mounted, the same being, in turn, normally pressed into the position shown in Fig. 13, and corresponding to that shown in Fig. 14, by a spring 101 having one end engaging the pawl midway between the ends of the latter as shown, and the other end wrapped around the portion 98 on the next adjacent stud 97. Thus, the free end of the pawl is normally pressed inward through a suitable slot 102 in the sleeve 94 so that it may engage with a co-operating longitudinal resetting groove 103 in the shaft 93 during resetting, as hereinafter described. Further, it will be observed that a suitable spacer 104 is disposed between the pawl 100 and the gear 84, and that the latter has the reduced portions 99 projected therethrough and suitably turned over, or riveted, to form a unit therewith. Attention is also directed to the fact that a locking member 105 is similarly riveted to reduced ends 106 on the opposite extremities of the studs 97, and that these serve to fix the locking member, number wheel, and stud rigidly together, while a reduced portion 107 on the sleeve 94 is provided with a notch 108 receiving a corresponding projection on the locking plate in such manner as also to connect the sleeve 94 rigidly to these elements. Here, it will also be observed that the plate 105 is provided with a laterally spaced portion 109, herein struck out laterally from the surface thereof and connected thereto by inclined lateral strips 110, and that this portion 109 is provided with a single tooth aperture 111 disposed inside the periphery of the locking plate 105 and so located as to project laterally into the space between the plate 105 and the gear 112 for the next counter wheel 91 to co-operate with transfer means hereinafter described.

The middle counter wheel 91 is operatively connected to the right hand counter wheel 92 through transfer mechanism including a transfer gear 115 rotatably mounted on a transfer gear shaft 116, herein stationary and carried on the upper ends of the adjacent upstanding extensions 39 on the frame arms 38. Herein, this transfer pinion includes wide teeth 117 and alternately disposed narrow teeth 118, of which, both sets of teeth are adapted to be received between the teeth of the gear 112, while the wide teeth are also receivable in the toothed aperture 111 carried on the locking plate 105, all in such manner as to cause a usual rotation of the wheel 91 through one-tenth of a revolution for each complete revolution of the wheel 92.

Referring next to the structure of the middle unit 91 more in detail, it will be observed that the wheel proper is identic in construction with the member 92 and provided with like studs 97, and a like resetting pawl 100 co-operating with the same groove 103 in the shaft 93 through a like slot 102 in a like sleeve 94 and having a like spring 101 and a like spacer sleeve 104 positioning the pawl on a like reduced portion 98. Here, however, it will be observed that, instead of the gear 112 being carried on the reduced extremities 99 of the studs, a disc 120 abuts against the spacer sleeve 104 and the ends of the reduced portions 98, and that ratchet mechanism is provided between this plate 120 and the gear 112. Herein, this ratchet mechanism includes a small ratchet member 121 smaller than and rotatable with the gear 112 and suitably attached thereto, as by rivets 122, and a pair of co-operating pawls 123 rotatable on certain of the reduced portions 99 which project through the plate 120. The pawls 123 herein also have blunt nosed portions 124 engageable in wide apertures between the teeth on the ratchet member 121 and are normally pressed into engagement therewith by springs 125, the opposite ends of which pass over intermediate projections 99 and under and over struck up abutment portions 126 and 127 on the disc 120, one end of each spring being hooked over one of these projections 127. Herein, it will also be noted that a tail 128 on each pawl 123 is adapted to engage the opposite face of the projection 127 when the operating end 124 is in engagement with the teeth of the ratchet 121.

Attention is here also directed to the fact that between the gear 112 and the locking plate 105, improved stop means are also provided. These, as shown, include a pawl carrier 129 shown in Fig. 16, and suitably fixed by a key 130 for rotation with the extremity of the sleeve 94 which projects from the member 91 beyond the gear 112. As shown, this plate 129 has a pawl 131 pivotally mounted therein and normally pressed outward by a spring 132 connected between a projection 133 on the pawl and a projection 134 on the pawl carrier, and adapted to engage with a projection or cam 135, herein rounded, on the inner side of the member 109 on the plate 105. Thus, it will be evident that when the second wheel 91 is being rotated relatively to the first wheel 92, the pawl 131 and projection 135 will provide a stop for the wheel 91 when this pawl engages the portion 135 during resetting, while permitting free movement during counting.

The structure of the left hand counter unit or wheel 90 being similar to that of the counter unit 91, save that lighter spring means are used in 90, as hereinafter mentioned, and unit 90 also being provided with connections between it and the unit 91, similar to those between units 92 and 91 including a similar stop mechanism, a further description of the same is unnecessary. It will, however, be apparent that the several units will count as usual through their transfer mechanisms while moving clockwise in Figs. 13 to 16 and counterclockwise in Figs. 17, 17a and that all will be reset upon rotation of the shaft 93 while the units move in the same direction as in counting. Moreover, it will be noted that improved stop means are provided operative during resetting, whereby the second wheel is caused to stop against the first wheel and the third wheel to stop against the second wheel, in such manner as to produce effective overthrow preventing means for the several wheels other than the first wheel, and thereby insure accurate resetting of the counter when the movement of the first wheel is properly controlled, as hereinafter described, during the resetting operation.

The resetting mechanism (Figs. 9 to 11) is actuated by the resetting member 6 and operates to reset all of the counters 4, 4' and 5, 5', while this member 6 is being rotated through a single revolution. Here, it will be noted, that the member 6, which herein is in the form of a longitudinally separable winged member, is provided with a pin 140 in its working end and is adapted to be received in either of two sleeves 141, 141' disposed on the opposite protruding ends of a main reset shaft 142 coaxial with the member 6, the sleeves 141 each having suitable slots 143 adapted to receive the pins and also being suitably fixed to the ends of the shaft as by pins 144. As shown, the shaft 142 is suitably journaled in the frame members 30 at equal distances from the axes of the four counter reset shafts 93 and is further connected to each of these shafts by a train of spur gears disposed on the frame members 30 which carry the totalizer counters 7 and 8, this train of gearing being shown in Fig. 7. As illustrated in that figure, a spur gear 145 is fixed to the protruding end of the shaft 142 between the sleeve 141' which projects above the money counter 8 and the adjacent frame member 30. This gear 145 in turn meshes with co-operating gears 146 and 147 mounted for independent rotation on the shafts 82 and 62, respectively, between collars 148 fixed to the extremities of said shafts and the adjacent frame member 30. Herein also co-operating spur gears 149 and 150 are disposed coaxially with the gears 146 and 147 and between the same and the frame member 30, each pair of gears 146, 149, and 147, 150 being rotatable as a unit. Of these gears 149 and 150, the gear 149 meshes with a pair of gears 151 and 152 respectively coaxial with the money counters 5'—5 and fixed to the projecting ends of the reset shafts 93 thereof outside the frame member 30, while being angularly adjustable relative to external hub members 153 fixed to the shafts through slots 154 in those members and clamping screws 155 threaded into the gears. As shown, the gear 150 is similarly connected to gears 156 and 157 similarly disposed and connected through the reset shafts 93 for the gallon counters 4—4'.

Figure 7:
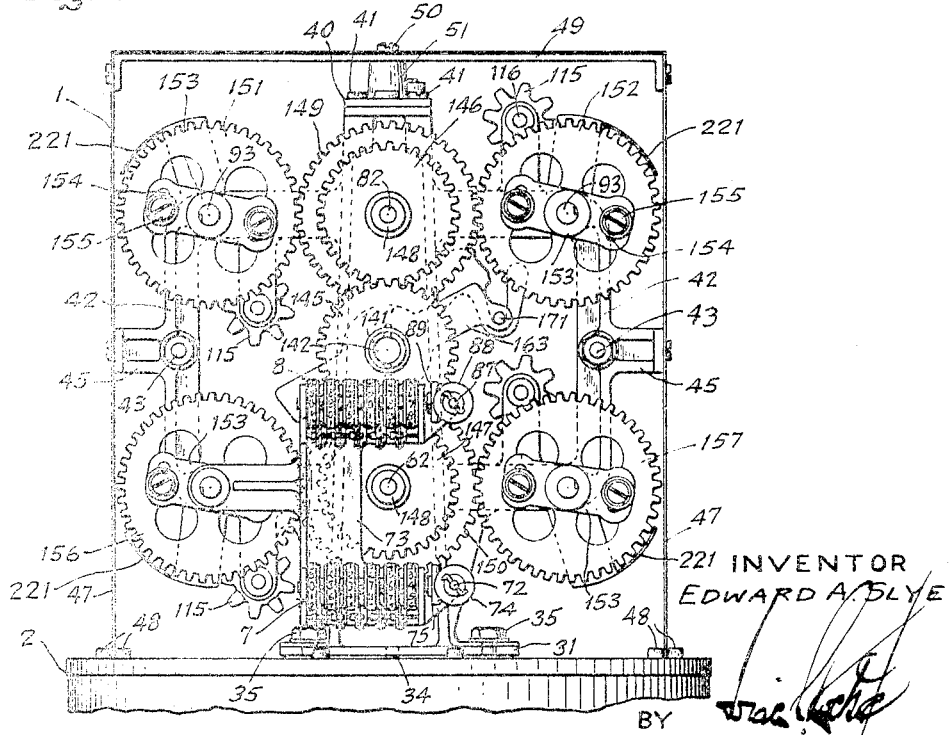
Figure 7 is a view similar to Fig. 2, but with the casing removed to show the mechanism.
Figure 10:
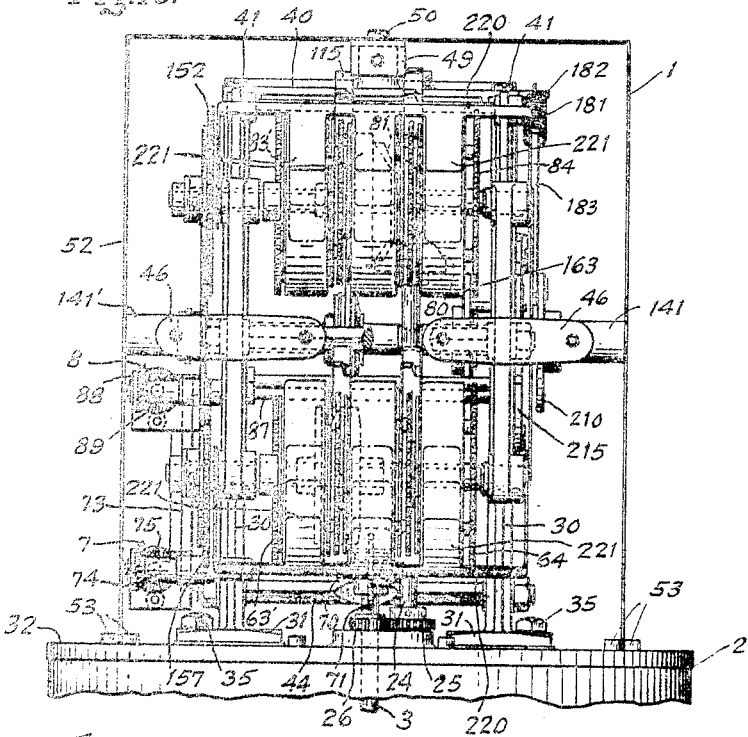
Figure 10 is a view of the upper counter part of Fig. 1, but with the casing removed to show the mechanism, the shutters here also being shown in dotted and full line positions.

Thus, it will be evident that when the reset shaft 142 is rotated in one direction, clockwise in Fig. 6 or counter-clockwise in Fig. 7, depending upon the sleeve 141, 141' into which the member 6 is inserted, the gear 145 will be rotated, and this will simultaneously rotate the gears 151, 152, 156, and 157 to rotate the resetting shafts 93 of the counters 5', 5, 4' and 4 simultaneously and, through the reset pawls 100 in the several counters, picked up by the reset grooves 103 in the shafts 93, cause the several counter wheels 90, 91, 92 of each counter to be picked up as its reset shaft 93 is rotated. Accordingly, all the counters 4, 4', 5, 5' will be reset in zero position upon the completion of one revolution of the shafts 93, the shaft 142, and the reset member 6. Further, the stop member 131 on the wheel 90 of each counter will come into contact with the co-operating stop surface 135 on the plate 105 of the unit 91 thereof, and the like stop 131 on the counter unit 91 will also engage the part 136 on the member 105 of the unit 92, all in such manner as to prevent overthrow of these wheels 90, 91 during the resetting operation and cause these to be stopped in the zero position of the unit 92.

Co-operating with this mechanism is also improved mechanism for preventing overthrow of the first wheels 92 during resetting and thereby establishing the resetting position of the second and third wheels which depend on this first wheel as above described. This improved mechanism herein includes (Fig. 23) a stop lug 160 inside the periphery and on the inner face of the gear 83 which drives the money counter 5 and a like lug 161 on the gear 63 which drives the gallon counter 4. Further, it will be noted that the main reset shaft 142 has fixed on the same, as shown in Fig. 22, a collar 162, on which a co-operating lever 163, disposed between friction discs 163', is journaled and pressed toward the collar by a coaxial four armed spring disc 164, likewise also positioned on the collar 162 by a suitably connected holding collar 165, all in such manner as to form a friction clutch, the function of which is hereafter described. The ends 166 and 167 of this member 163 are also so shaped and disposed (Fig. 23) that they are adapted to provide stops for the lugs 160, 161 upon completion of resetting, while these ends are at all other times disposed out of the path of the lugs, improved controlling mechanism likewise hereinafter described being provided to effect the necessary movements of the member 163. Thus, it will be evident that, with the gears 83 and 63 which drive the first number wheels 92 of the counters 5 and 4, respectively, stopped against overthrow during resetting by the lugs 160, 161, the first wheels 92 of these counters will not overthrow during resetting. Further, these wheels 92 being stopped and the wheels 91 being stopped against them by engagement of the parts 131 and 135, while the wheels 90 are stopped by engagement of their stops 131 with the part 135 on the wheels 91, overthrow of all of the counter wheels 92, 91, 90 of these counters 5 and 4 will be effectually prevented. Similarly, the driving gears 63' and 63' for the counters 5' and 4' being rotatable with the gears 83, 63, the first wheels 92 of these counters will also be stopped against overthrow by the member 163 and lugs 160, 161, while the wheels 91 and 90 thereof will be similarly stopped by the engagement of their stops 131 with the stops 135 on the members 165 of the wheels 92 and 91, respectively.

Referring more particularly to the mechanism for controlling the member 163, it will be noted that the latter is provided with a downward extension 170 below its end 166, and that this extension carries a pin 171 extending longitudinally of the main reset shaft 142 and having a reduced extremity 172. As shown, the pin 171 extends out under the mesh line of the gears 83, 84 so that its reduced end 172 is disposed in the plane of movement of a cam member 173 pivoted at 174 on the outside of the adjacent frame member 30. This cam member, during counting, occupies the position shown in Fig. 6, wherein it will be noted that the reduced extension 172 is disposed in the bottom of a substantially V-shaped opening or notch 175 open at the top and having a laterally projecting lug 176 adjacent the top and defining an upper limit of movement of the stop member 163 (see Fig. 18) reached when the main reset shaft 142 is initially rotated to effect resetting and before the actual resetting operation begins. In this position of the parts, it will be noted that the ends 166 and 167 of the member 163 are moved down into adjacency to the paths of the lugs 160 and 161 but not into said paths. The member 163 is maintained in this position during the first stage of the actual resetting operation, a segmental cam 177 rotatable with the main reset shaft 142, then underlying a depending projection 178 intermediate the ends of the cam 173. Attention here is also directed to the fact that after the initial movement of the member 163, the reset shaft 142 is rotatable relative to this member 163 by reasons of the friction clutch 163', 164, etc. As the cam 177 is rotated further to the right during resetting, see Fig. 18, it will also be noted that the advancing end of this cam 177 engages a depending tail portion 179 on the opposite end of the cam 173 from the notch 175 and forces this tail portion 179 up in such manner as to lower the opposite end of cam 173. This lowering movement of the cam 173 permits the reduced extremity 172 on the pin 171 to travel from the position shown in Fig. 18, through the dotted line position shown in Fig. 19, to the full line position shown therein, wherein it will be noted that the ends 166, 167 of the member 163 are disposed in the path of travel of the lugs 160, 161 ready to be engaged by these lugs upon the completion of the resetting operation. Here it will also be noted that during the remainder of the resetting operation, the depending lug 178 on the cam 173 rides around on a round cam surface 180 which is movable with the segmental cam 177 and struck on a smaller radius, and extends around from one end of cam 177 to the other. Further, the cam 173 with its lug 178 is also returned to its raised initial position, i. e. ready for another resetting operation, by a spring 181 connected between a projection 182 on the top frame plate 40 and one end of a generally T-shaped lever 183 which is pivoted at 184 on the outside of one frame member 30 and controlled by further reset controlling mechanism hereinafter described, the lever 183 having a pin 185 engageable with the top of the tail 179 of the cam 173 at the completion of resetting to return the latter to its initial position and thereby permit the stop lever 163 to return during the counting to its normal position, wherein it is out of the paths of the lugs 160, 161.

Operatively associated with the main reset shaft and actuated by rotation of the latter is also improved brake mechanism co-operating with the clutches 61', 81', in the gallon and money counter drives to insure an accurate count through preventing an error in the count due to backlash in the drive all the way from the meter and variator. Here, it will be noted that each of these clutches, heretofore referred to without specific description, includes, as shown in Figs. 21 and 22, not only a sleeve 190 on the bevel gears 61 or 81, and a co-operating clutch part 191 fixed to the shafts 62 or 82, but also a clutch band 192 of suitable material, as spring metal, disposed within the periphery of the sleeve 190 and provided with suitable means for expanding this band to cause the connection of the members 190, 191 in a well known manner. Herein, a member 193 rotatable with each member 191 projects inside the member 190 as shown in Figs. 21 and 22, and has a bent end of the band 192 disposed in a slot 194 in the extremity of this member 193, while a coil spring 195, seated in a suitable lateral aperture in the member 193, engages the other bent end of the band 192. Thus, the coil spring 195 tending to expand the band 192, a normally operative clutch connection is provided between each of the bevel gears 61, 81 and their coaxially disposed shafts 62, 82, respectively, which, while operative to transmit the rotation of the pinions 60 and 80, respectively, to the several gallon counters 4, 4' and money counters 5, 5', is adapted to slip during resetting through the co-operation of improved brake mechanism associated therewith and controlled by the rotation of the main reset shaft 142.

This brake mechanism, as shown in Figs. 21 and 22, includes a spring clutch, generally similar to the clutch 162, 163, 164 and 165, heretofore described in connection with the stop member 168. More particularly, the same herein includes a like collar 196, suitably fixed to the shaft 142, and a like spring disc 197 positioned by a like holding member 198 and acting to connect a clutch operating member 199 for rotation with the shaft 142 within the frictional limits of the disc 197. Herein, the member 199 has suitable friction discs 199' on its outer faces and is also provided with an annular slot 200. In this slot are pivoted at oppositely located points and by pins 201 and 202, the upper and lower curved, embracing, ends 203 and 204, respectively, of gripping members 205 and 206, each of which has spaced gripping arms 207 and 208 in turn adapted to grip or release the periphery of the sleeve 190 on the clutches 81', 81' at spaced points as shown in Fig. 21. Thus, it will be noted that, when the main reset shaft 142 is rotated to initiate resetting and before the actual resetting operation begins, i. e. while the slack is being taken up, the rotation of the shaft 142 will be transmitted through the spring disc 197 to the clutch actuating member 199 to rotate the latter and thereby cause the pin 201 of the member 205 to move downward and the fingers 207 and 208 of that member to grip the sleeve 190 of the clutch 81', while the pin 202 of the member 206 will be moved upward in such manner as to cause the fingers 207 and 208 of this member to grip the sleeve 190 of the clutch 81'. Further, it will be evident that with these elements 190 of the two clutches 81', 81' thus held against rotation by the brake mechanism provided, the main reset shaft 142 will nevertheless be free to continue to rotate to drive the counter resetting gearing driven from the gear 145, the frictional limit of the disc 197 being such that this disc will slip relative to the member 199 as the shaft continues to rotate.

As a result of this brake mechanism, it is made possible to prevent the substantial inaccuracy in subsequent counting movement otherwise arising from the dragging forward during resetting of the complete train of gearing in each of the money and gallon systems in the same direction as during normal counting. More particularly, without the brake mechanism, during resetting, the tendency is for the counter drive shafts to drive the meter, instead of the meter driving the counter, and thus to leave the counter, when reset, with an accumulation of backlash between the counter and the meter. As a result, the meter when resuming operation would have to move an amount equal to the total backlash before the counter wheels would again start operation, and neither the liquid dispensed during this interval nor the cost of the same would be registered. In my improved construction, however, the brake mechanism holds the clutch sufficiently rigid so that resetting may be accomplished without dragging the train forward in the direction of counting, up to the limit of the total backlash in the gears and bearings, and thus eliminates the backlash error otherwise present in both trains and which is very considerable in the case of the money counter, in view of the inclusion of the variator gearing in that train. At the same time, it will be observed that the clutches continue to provide sufficient friction to prevent overtravel of the counter wheels when the meter is stopped suddenly, as by stopping the flow of gasoline at any time. Attention here is also directed to the fact that in my improved construction, the totalizers 7 and 8 are unaffected by the backlash, the same being positively geared to the drive shafts 3 and 24 ahead of the clutches 81', 81', so as to be wholly free from any accumulation of error.

Operatively associated with the main reset shaft 142 is also improved means (Fig. 18) for preventing manipulation of the reset shaft to falsify the count on any of the counters 4, 4', 5, 5'. Here it will be noted that spaced in front of the cams 177 and 180 is a coaxial cam member 210 having a substantially V-shaped notch 211 in its periphery. This cam 210 is also fixed to the shaft 142 for rotation therewith and herein is so disposed that the notch 211 therein is spaced approximately a quarter of a revolution from the adjacent end of the segmental cam 177. Further, it will be noted that the spring connected member 183, heretofore described, also has a depending extension 212 thereon projecting below the pin 185 and which, in turn, carries on its lower extremity a laterally extending lug 213 having a rounded back 213a and a slabbed off or straight opposite face 213b, which lug is adapted normally to be seated in the notch 211 by the spring 181, see Fig. 6. Further, it will be noted that when, during resetting, through rotation of the actuating member 6, the shaft 142 and notched cam 210 are rotated to the right from the normal position during counting, shown in Fig. 6, the rounded surface 213a of this lug 213 will ride up the left hand wall of the notch 211 and out on to the round periphery 214 of the cam 210 and be retained thereon throughout the remainder of the resetting operation. Thus, the spring 181 is tensioned so that the latter is prepared to return the lug to the notch 211 upon the completion of resetting, and also, through its pin 185, to force down the tail of the cam 173, as previously described in connection with the stop mechanism for the first wheels 92 of the several counters. Attention here is also directed to the fact that a pawl 215 is suitably pivoted at 216 beneath the cam 210 and normally pressed upward by a suitable spring 217 in such manner that, as soon as the segmental cam 177 has passed the pawl 215, the latter will move in behind the end of the cam 177 and thus prevent any reverse manipulative movement beyond the limit established by the pawl, while requiring the operator to rotate the main reset shaft through the remainder of its normal resetting revolution to effect movement of the several counters 4, 4', 5, 5'. Further, it will be noted that, after the pawl 215 has dropped in behind the cam 177, although the operator may thereafter reverse the shaft 142 and the cams 210 and 177, and by the rotation of the shaft 142 release or apply the brake members 205 and 206 and reversely operate the train of reset gears driven by the gear 145, all, of course, depending upon the extent of rotation of the cam 177 before reversal is attempted, he cannot, in any way, alter the count on the counter wheels. Instead, each of the latter remains in the position on the way to resetting position which it occupied when reversal began, and it is necessary for the operator not only to turn the shaft 142 and its connected cams forward to his previous stopping point, but further in the resetting direction to effect any movement of these wheels. Thus, again moving the shaft 142 in the right or resetting direction, clockwise in Fig. 6, all of the other mechanism which may have been displaced during a reverse movement is again properly actuated by the resumption of resetting movement in such manner that upon the completion of resetting movement the counter is again ready for use on the next dispensing operation.

Operatively connected with the T-shaped member 183 and operative by the cam 210 and lug 213 on the member 183, is also improved shutter mechanism simultaneously operative on all four of the counters to shroud and clear the same at the beginning and end of each operation of the main reset shaft 142. Herein, this mechanism includes pivotally mounted U-shaped shutter members 220 each having arms journaled at the extremities of the reset shafts 93 and a plurality of depending shutter portions 221 adapted to close apertures 222 in the casing members 47 in such manner as to shroud all the counter wheels during the resetting operation. More particularly, it will be noted that these shutters 220, during counting, are disposed in the inoperative dotted line position shown in Fig. 18, while, during resetting, the same are disposed in the full line positions illustrated in that figure through improved operative connections to the member 183. These operative connections herein include, in the case of the shutter for the counter 5, a link 219 pivoted at 223 to a depending extension on the shutter adjacent the pivot thereof, and also pivotally connected to an extension 224 on the shutter for the counter 4, while this extension 224 is also pivotally connected at its extremity to a link 225, which is, in turn, pivotally connected to the actuating lever 183 at a point below the connection of the latter to the spring 181. Further, it will be noted that the shutter 220 for the counter 5' is provided with a lateral extension 226, corresponding generally to the extension 224, pivotally connected to the adjacent extremity of the opposite arm of the lever 183, while the lateral extension 226 is also pivotally connected at a point more remote from its end to a third link 227 which is pivotally connected to an upward extension on the shutter 220 for the counter 4'. Thus, it will be evident that upon an initial movement of the shaft 142 in a resetting direction, as member 213 moves outward in the notch 211, the depending portions 221 on all of the shutters 220 will be moved by this linkage described part way down over the number wheels to the position indicated in Fig. 24. Moreover, as soon as the member 213 occupies the position on the cam 214 illustrated in Fig. 18, these depending portions 221 will be moved through their linkage into the full closed or shrouding position shown in Fig. 25, and, being held in that position by the cam 214 until the member 213 again enters the notch 211, will thereafter continue to shroud the wheels until the resetting operation is completed. Thus, the operator is wholly unable, through manipulation of the reset operating member 6 and main reset shaft 142, to clear the counter wheels 4, 4', 5, 5', save by moving the main reset shaft to reset position. Then, when the member 213, passing off the cam 214, again comes opposite the notch 211, it will be projected down into the latter by the spring 181 and the latter spring will also return all of the shutters 220 to their wheel clearing position, indicated in dotted lines in Fig. 18 and shown in Fig. 1.

As a result of this mechanism, it will be evident that an operator, seeking fraudulently to advance the count, is not only unable to advance the individual wheels 90, 91, 92 of any of the counters 4, 4', 5, 5', and, further, is unable to see any of these wheels in such manner as to afford him desired guidance in manipulative operations, but is compelled in order to avoid detection to turn them to clear position, since the shrouding of the wheels at any time acts as a signal to his superior or his customer indicating that manipulation is being attempted. This is an especially effective means of protection for the customer in view of the fact that the average customer, naturally being interested in the cost of the transaction to him, and further being interested in the very interesting action of the counter in progressively indicating the cost to him, makes it a point, not only to see that the wheels are at zero when dispensing begins, but also to watch the operation of the same as they count up the amount which he is to pay the operator at the end of the dispensing operation.

In connection with the spring 181, it will be noted that the same, acting through the lug 213 and notch 211, also serves to turn the reset shaft 142 slightly backward following manual release of the member 6 in such manner as to move the shoulders of the grooves 103 in the shafts 93 away from the resetting pawls 100 of the counter units 90, 91 and 92. This backward movement not only insures the return of the shaft to initial position, but also effects such a reverse operation of the cam 173 as to insure unlocking of the stops of the lugs 160, 161 on the first wheel or unit 92 of each of the counters 4, 5, and thereby also releases these wheels for the resumption of counting. Attention is moreover directed to the fact that this backward movement of the resetting shafts 93 also insures that the resetting pawl 100 of any counter wheel 90, 91, 92 which might be about to assume zero position will surely be picked up by its reset groove 103, thus preventing advance of such a wheel to its "1" position by the adjacent wheel of lower order as the latter moves from "9" to "0" during resetting.

In considering the operation of the device as a whole, it will be evident that when, with the counters 4, 4', 5, 5' at zero, the pump is started, the meter will operate the gallon counters 4, 4' through the meter shaft 3 and bevel pinion 60 in such manner as to cause these counters progressively to indicate the number of gallons, with the first wheel 92 indicating tenths of gallons, the next wheel 91 indicating gallons, and the third wheel 90 indicating tens of gallons. Similarly, depending upon the particular price setting established by the pin and hole connections, 13, 14, and 15 of the variator, the shaft 24 of the variator, which is driven from the shaft 3 through the variator, will drive the bevel pinion 80 in such manner as progressively to register on the counters 5, 5' the price of the liquid being dispensed, the wheels 92 registering the same in cents, while the wheels 91 register the same in tens of cents, and the wheels 90 register the same in dollars. Thus, for example, if ten or thirteen gallons of gas is ordered, the pump is stopped by the operator when the gallon counter indicates ten or thirteen, while if a dollar's worth of gas, or a dollar and thirteen cents' worth of gas is ordered, the operator stops the pump when the cost or money counter indicates a dollar or a dollar and thirteen cents. Further, during each dispensing operation, the gallon totalizer counter 7 and the price or money totalizer counter 8 function progressively during each filling operation. At the end of each filling operation, also, the operator, by rotating the main reset shaft 142, by the member 6, through one complete revolution, returns all of the counter wheels 4, 4', 5, 5' to zero position, these wheels being shrouded by the depending shrouding portions 221 during the resetting operation and just prior to the first click of the reset mechanisms in the several counters, and these shrouding portions also only dropping back to expose these wheels again when all of the latter are in zero position, i. e. when, on the tenth click, the lug 213 drops into the notch 211, and the spring 181 then functions to return the parts to starting position. At the end of the day, the total sales in gallons and in money may, of course, be determined by readings of the totalizers 7 and 8, and a comparison of these readings with the readings of the previous day.

In this construction, it will be particularly noted that an accurate count is obtained, not only as a result of the improved means provided for preventing overtravel of the counter wheels, but also as a result of the means provided for eliminating any tendency to include error in the count due to backlash in the gearing in either train and which is especially marked in the money train including the variator. This last is due to the fact that, if it were not for the action of the brake in holding shaft 24 and one of the elements of the differential mechanism stationary, all of the backlash of the latter mechanism would be taken up during resetting and would constitute error in the next counting operation. Further, as this backlash in the differential mechanism varies within wide limits for different price settings, while the backlash in the meter drive is relatively small in amount and substantially constant, there would be serious disagreement between the amounts indicated on the cost and quantity counters for any given price setting were it not for the action of the braking mechanism which eliminates variator backlash and, acting on both drives, eliminates the effects of backlash in either drive. Further, due to the action of the brake means and the overthrow preventing means, both herein operated by improved operative connections from a common reset operating member, agreement for any given price setting between the several counters comprising the cost and quantity counters is obtained, while tampering with any indication on the cost and quantity counters is prevented by the shutter mechanism, herein also having improved operative connections to the above mentioned common reset operating member. Attention here is further directed to the fact that as a result of my improved structure, mechanism is provided for insuring the return of the counter wheels, 90, 91 and 92 to zero, the several means, including the reset means, the means for effecting a reverse rotation of the reset shafts, the springs of different strength in the units 90, 91, the means for stopping the first wheel in zero position, and the means for stopping the subsequent wheels in that position, all here cooperating to insure this desired return of the several wheels. More particularly, it will be noted that, although the reset shaft initially functions in a unusual manner, the later automatic reverse rotation thereof cooperates to this desired end after the stop means have functioned, while the provision of a heavier spring in each middle counter unit 91 than in the unit 90, makes it possible to prevent the advance of the middle wheel 91 during resetting which otherwise occurs in certain positions of the wheels. Here note that when the middle counter unit is at its "9" position, it is unlocked as regards its transfer pinion and hence, at this point it can be carried forward to "0" by the next higher order wheel if the springs 125 in the clutch in this higher order wheel are as strong or stronger than those in the middle wheel. Thus, if the count is 597, the resetting movement of the "5" wheel to "7" may carry the unlocked "9" wheel to "0"; and when the wheels are moved from 909 at the end of the resetting movement to what should be the 000 position, the reading will be 010 due to the transfer taking place from the lowest order wheel to the middle wheel. Thus another complete resetting rotation would be required to reset the wheels to zero. This undesirable advance of a "9" wheel is prevented by having the clutch spring of the middle counter unit sufficiently stronger than that of the highest order unit to prevent such dragging forward of the middle wheel. It will also be especially noted that, as a result of my improved braking mechanism, it is made possible to eliminate any discrepancy between the totals of the several operations on the counters 4, 4' and 5, 5', between these totals and the sums shown by the totalizers 7 and 8, and arising from successive resetting operations due to backlash in the several drives, which discrepancy, without the use of my improved construction, amounts to a very substantial total. Moreover, the resetting mechanism is rugged and effective even when abusively operated and also provided with such safeguards as to prevent tampering on the part of the operators, while being quickly and conveniently operated. These and other advantages of my improved construction will, however, be clearly apparent to those skilled in the art.

Figure 26:
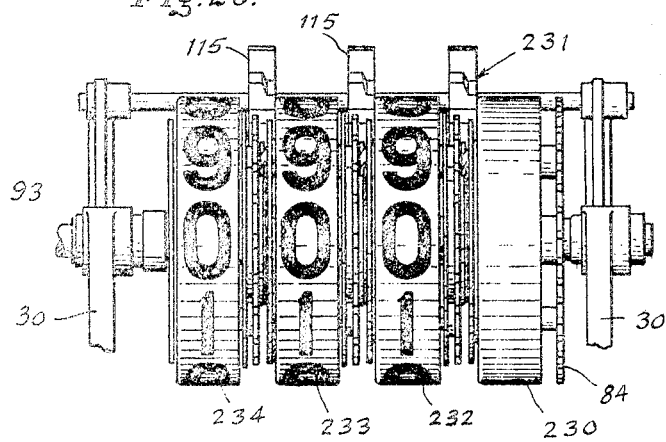
Figure 26 is a view similar to Fig. 12 showing in elevation a modified form of counter including a supplemental initial gear counting tenths of cents.
Figure 27:
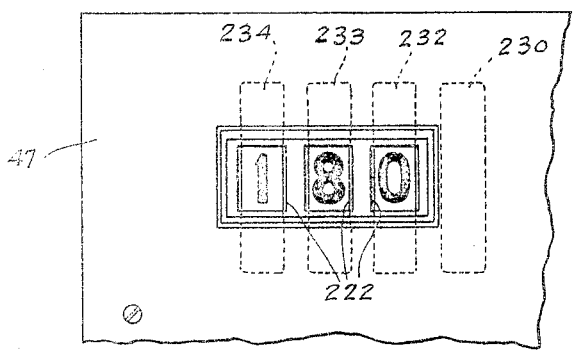
Figure 27 is a side view of this modified counter construction of Fig. 26, within the casing with the additional wheel shrouded by the casing.

In Figs. 26 and 27, I have illustrated a modified price counter construction which may be used if desired to count tenths of cents and step the unit 92 along by impulses. This construction is essentially similar to that previously described, save that it includes an additional counter unit or wheel indicated at 230, similar to the unit 92 and provided with additional transfer means 231. Herein, this counter wheel 230 is not provided with numbers on its surface or visible from the exterior of the casing, although it of course may be suitably graduated and visible, if desired. Here, further, it will also be understood that with such a construction, the initial gearing will be increased as, for example, by 10 to 1, and that the unit next adjacent the unit 230, herein indicated at 232, will correspond in construction to the unit 91, rather than to the unit 92 described in this application, while the other units 233 and 234 will be identical with the unit 232. Obviously also, the operation of the mechanism will be essentially similar to that described save that the wheel 230 will index the cents wheel 232 just as the present cents wheel indexes the ten cents wheel. While this additional wheel 230 may be made visible under certain conditions, this is not ordinarily required, the positions of the number on the cents wheel 92 of the present construction above or below a central position, indicating the price sufficiently accurately for usual purposes. It will of course be evident that this same impulse drive may be added to the quantity counters if desired.

While I have in this application specifically described these embodiments of my invention, it will be understood that the same are used for purposes of illustration and that the invention may be modified and embodied in various other forms without departing from its spirit or the scope of the appended claims.

What I claim as new and desire to secure by Letters Patent is:

1. The combination with a counting mechanism, a train of driving mechanism, and resetting mechanism including a resetting member operative to reset the counting mechanism in a counting direction in all positions of said counting mechanism, of means controlled by said resetting member for eliminating error in the count following resetting due to backlash in said train.

2. The combination with a counting mechanism having a plurality of operatively connected counter wheels, a train of driving mechanism and resetting mechanism including a resetting member operative to reset the counting mechanism in a counting direction in all positions of said counter wheels, of a drive shaft driving said driving mechanism, and means acting on said driving mechanism and operable by said resetting member for holding said drive shaft against angular movement in a counting direction during resetting.

3. In combination, a counter having a plurality of number wheels, transfer mechanism for actuating the wheels of higher order, resetting mechanism for zeroizing said wheels in the same direction in all positions thereof, and a train of driving mechanism including a clutch connection having two cooperating elements, means for driving one of said elements during counting while the drive through said elements remains operative, and means to drive the other element during resetting of said number wheels while said elements remain engaged and permitting relative movement between said elements.

4. In combination, a counter having a plurality of number wheels, transfer mechanism for actuating the wheels of higher order, resetting mechanism for zeroizing said wheels in the same direction in all positions thereof, and a train of driving mechanism including a clutch connection having two cooperating elements, means for driving one of said elements during counting while the drive through said elements remains operative, means to drive the other element during resetting of said number wheels while permitting relative movement between said elements, and means controlled by said resetting mechanism for holding said first mentioned element during resetting.

5. In combination, two counting mechanisms in side by side relation, each including a plurality of counting wheels, a common driving member for said counting mechanisms, driving connections between said driving member and said wheels including means for driving the diagonally opposite counting wheels of said counting mechanisms from said member, transfer mechanism for actuating the higher order wheels, and resetting mechanism including a common reset operating member for returning said counting wheels to zero at the end of any operation of said driving member.

6. In combination, two counting mechanisms in side by side relation, each including a plurality of counting wheels, common driving means for said mechanisms including an element independently rotatable during resetting, driving connections between said driving means and said wheels including means for driving the diagonally opposite counting wheels of said counting mechanisms from said element, transfer mechanism for actuating the higher order wheels, and resetting means driving said element for returning said counting wheels to zero also during resetting.

7. In combination, two counting mechanisms in parallel relation, each including a plurality of counting wheels, a common driving member for said mechanisms, driving connections between said driving member and said wheels including means for driving the diagonally opposite counting wheels of said counting mechanisms from said member during counting, transfer mechanism for actuating the wheels of higher order, and resetting means having operative connections with all of said counting wheels for rotating the latter to zero position including connections for rotating the driving connection between said diagonally opposite counting wheels during resetting.

8. In combination, two counting mechanisms in side by side relation, each including a plurality of counting wheels, common driving means for said mechanisms including an element independently rotatable during resetting, driving connections between said driving means and said wheels including means for driving the diagonally opposite counting wheels of said counting mechanisms from said element, transfer mechanism for actuating the wheels of higher order, and resetting mechanism having means for driving said element during resetting while preventing the rotation by said resetting means of certain other elements of said driving means and also having means operatively connected to said element for resetting said counting mechanisms.

9. In combination, two sets of denominational order counting wheels in side by side relation having the lowest order wheel of one set opposite the highest order wheel of the other set, driving means driving the diagonally opposite lowest order wheel of each set, transfer mechanism for actuating the higher order wheels, mechanism for returning said wheels to zero, means for stopping in zero position one wheel of each set of wheels, and cooperating stop means for stopping in zero position the remaining wheels in each set.

10. In combination, two counting mechanisms in side by side relation, each having a plurality of denominational order counting wheels, said mechanisms being transposed end for end so that the lowest order wheel of one mechanism is opposite the highest order wheel of the other mechanism, common driving means disposed on an axis parallel to the axes of said mechanisms, driving connections between said driving means and said counting mechanisms driving all of said wheels, transfer mechanism for actuating the wheels of higher order, and means for returning said wheels to zero while maintaining the same connected to said driving connections.

11. In combination, two counting mechanisms in side by side relation, each including a plurality of operatively connected counting wheels, common driving means for said mechanisms including an element having counter driving gears thereon, a resetting shaft having an operative connection with said counting wheels for rotating the latter to zero position, a control member movable during the resetting movement of said shaft into and out of an operative position, and stop means rotatable with said counting wheels as they approach zero position and engageable with said member in the operative position of the latter during resetting to limit the movement of said counting wheels in a resetting direction.

12. In combination, a quantity counting mechanism and a cost counting mechanism, each including an axial shaft and a plurality of operatively connected counting wheels, driving and resetting means for each of said counting mechanisms including a gear having an operative connection with a counter wheel during counting and also rotating with the latter to zero during resetting, a resetting shaft common to both counting mechanisms, a control member controlled by said resetting means comprising arms extending on opposite sides of said resetting shaft into proximity to said gears, and abutment means carried by said gears and engaging said arms for limiting the extent of movement of said wheels in a resetting direction.

13. In combination, two counting mechanisms in side by side relation, each including a plurality of operatively connected counting wheels, common driving means for said mechanisms including an element therebetween having counter driving gears thereon, abutment members carried by said gears, a resetting shaft having an operative connection with the counting wheels of both mechanisms for rotating said wheels during resetting, a member carried on said resetting shaft and movable during the resetting movement of said shaft into and out of an operative position in the path of said abutment members, and means for holding said member in an inoperative position during the initial resetting movement of said resetting shaft.

14. In combination, two counting mechanisms in side by side relation, each including a plurality of operatively connected counting wheels, common driving means for said mechanisms including an element therebetween having counter driving gears thereon, abutment members carried by said gears, a resetting shaft having an operative connection with the counting wheels of both mechanisms for rotating said wheels during resetting, a member movable during the resetting movement of said shaft into and out of an operative position in the path of said abutment members, means for holding said member in an inoperative position during the initial resetting movement of said resetting shaft, and means operated upon further resetting movement of said resetting shaft to release said member for movement into its operative position in the path of said abutment means.

15. In combination, two counting mechanisms in side by side relation, each including a plurality of counting wheels, common driving means for said mechanisms including an element therebetween having counter driving gears thereon, abutment members carried by said gears, a resetting shaft having an operative connection with the counting wheels of both mechanisms for rotating said wheels to zero position, a member movable during the resetting movement of said shaft into and out of an operative position in the path of said abutment members, means for holding said member in an inoperative position during the initial resetting movement of said resetting shaft, means operated upon further resetting movement of said resetting shaft for effecting movement of said member into its operative position in the path of said abutment means, and means operable upon completion of the resetting movement of said resetting shaft for swinging said member out of the path of said abutment means.

16. In combination, two counting mechanisms in side by side relation, each including a plurality of operatively connected counting wheels, common driving means for said mechanism including an element therebetween having a counter driving gear thereon, an abutment carried by said gear, resetting mechanism including a resetting shaft having an operative connection with said counting wheels and a reset operating member, a stop arm movable during the resetting movement into and out of the path of movement of said abutment means, drive controlling means including a member on said shaft, and means operative upon completion of the resetting movement of said reset operating member to swing said stop arm out of the path of said abutment and operate said drive controlling means to recondition said drive for counting.

17. In combination, two counting mechanisms in side by side relation, each including a plurality of counting wheels, common resetting means for said mechanisms including a resetting shaft having a cam rotatable therewith, mechanism controlled by said cam during resetting including stop means operative to limit the rotation of said counting wheels in a resetting direction, means for disposing said stop means in limiting position during resetting, and means for rotating said resetting shaft reversely following operation of said stop means.

18. In a register mechanism, indicating mechanism, driving mechanism therefor and having a clutch provided with a driving member, resetting mechanism having means for and a driven member rotating said indicating mechanism in a counting direction during resetting in all positions of said indicating mechanism and rotating said driven clutch member in a counting direction during resetting, and means for preventing the rotation of said driving clutch member by said resetting mechanism during operation of said resetting mechanism.

19. In a counter, indicating mechanism, driving mechanism therefor and having a clutch including a driving member and a driven member, resetting mechanism for rotating said indicating mechanism in a counting direction during resetting in all positions of said indicating mechanism, braking means for preventing rotation of said driven member by said resetting mechanism, and means actuated upon operation of said resetting mechanism for applying said brake, and for maintaining the same applied while the resetting rotation of said indicating mechanism continues, and for automatically releasing said brake upon completion of resetting.

20. In a counter, a plurality of counting mechanisms, driving mechanism therefor, resetting mechanisms for said counting mechanisms individually operative to return said counting mechanisms to zero, common operating means for said resetting mechanisms including a rotating cam, and operative connections controlled by said cam and controlling the operation of said resetting means.

21. The combination with a counter having counter wheels and resetting means including a resetting member operable to move said counter wheels in a counting direction in all positions of said counting wheels to reset the same to zero, a driving train including a shaft driving said counter wheels, friction clutch means between said wheels and shaft, and brake mechanism which is inoperative during counting for holding an element of the clutch sufficiently rigid during resetting to prevent dragging the driving train forward in the direction of counting to the limit of the backlash in said train.

22. The combination with a counter having a counter wheel rotatable during resetting, and resetting means for rotating said wheel to reset the same including cooperating rotatable elements engageable during resetting and stop means stopping said wheel in zero position, of means for thereafter effecting reverse rotation of one of said elements to disengage said cooperating elements.

23. The combination with a counter including counter wheels, transfer mechanism for actuating the higher order wheels, resetting mechanism for said wheels including reset pawls on said wheels, a shaft having portions engaging said pawls and rotatable in a resetting direction to effect resetting of said wheels, and stop means stopping said wheels in reset position, of means for effecting prior to the next counting operation a reverse rotation of said shaft separating said portions from said pawls.

24. The combination with a counter having a counter wheel rotatable during resetting, and resetting means for rotating said wheel to reset the same including cooperating elements engageable during resetting, of means for effecting reverse rotation of one of said elements following resetting to disengage said cooperating elements including a member moved upon initial resetting movement in one direction during the movement of said cooperating elements into engagement and movable reversely upon the completion of resetting to disengage said elements, and a cooperating member rotatable by said resetting means and controlling the operation of said first mentioned member.

25. The combination with a counter having a counter wheel rotatable during resetting, and resetting means for rotating said wheel to zero including a pawl on said wheel and a resetting shaft having a portion engaging said pawl, of means controlled by said resetting means for effecting, prior to the next counting operation, a reverse rotation of said shaft, separating said shaft portion from said pawl, said means including a rotary member having a peripheral gap, a cooperating movable member having a projection normally located in said gap and movable out of said gap upon initiation of a resetting movement, and means for biasing said member in a direction to reenter said gap and rotate said rotary member reversely upon completion of said resetting movement.

26. The combination with a counter having counter units having clutch connected counter wheels, locking transfer means for actuating the higher order wheels, and resetting means for resetting said wheels while said transfer mechanism is locked, of abutment means for stopping the wheel of lowest order in zero position upon resetting, and cooperating abutment means for stopping a higher wheel in zero position.

27. The combination with a counter including a plurality of counter units of different order having spring clutch connected counter wheels, locking transfer means for actuating the higher order units unlocking any lower unit only in the transfer position of said unit, and resetting mechanism for resetting said units, of means for preventing advance of any unlocked unit by the adjacent higher order unit during resetting.

28. The combination with a counter including a plurality of counter units of different order having spring clutch connected counter wheels, locking transfer means for actuating the higher order units, and resetting mechanism for resetting said wheels, of means for preventing advancing a lower wheel beyond zero position during resetting including a stronger spring in the clutch of said lower wheel than in the next higher wheel.

29. The combination with a counter having counter units having clutch connected counter wheels, locking transfer means for actuating the higher order units, and resetting means for resetting said wheels, of means for stopping the wheel of lower order in zero position, cooperating means for stopping the higher wheel in zero position, and means for effecting a reverse rotation of an element of said resetting mechanism following resetting to release said wheels for resumption of counting.

30. The combination with a counter having counter wheels rotatable on a fixed axis, transfer means for actuating the higher order wheels, and resetting means, of means for preventing overthrow beyond zero position of an end wheel during resetting, and means automatically operative upon operation of said resetting means for preventing overthrow of the remaining wheels when said end and remaining wheels reach zero position.

31. The combination with a counter having counter wheels, transfer means for actuating the higher order wheels, and resetting means, of means for preventing overthrow beyond zero position of an end wheel during resetting, and means including cooperating stops movable relative to each other into engagement during resetting for preventing overthrow of the remaining wheels when said end and remaining wheels reach zero position during resetting.

32. The combination with a counter having counter wheels, transfer means for actuating the higher order wheels, and resetting means, of means on the first and second wheels constituting overthrow stop means for the second and third wheels during resetting, and cooperating stop means on the latter wheels engageable with said first mentioned stop means to prevent overthrow of said last mentioned wheels during resetting.

33. The combination with a counter having counter wheels and transfer means for actuating the higher order wheels, of means on the first and second wheels constituting overthrow stop means for the second and third wheels, cooperating stop means on the latter wheels engageable with said first mentioned stop means to prevent overthrow of said last mentioned wheels, resetting mechanism, and stop means operative thereby for said first wheel.

34. In combination, a counter having a plurality of number wheels and transfer mechanism for actuating the higher order wheels, resetting mechanism including pawls on said wheels and a cooperating reset shaft having means operative to pick up said pawls during resetting and return said wheels to zero, a counter drive having a brake therefor, means operative upon the initiation of operation of said resetting mechanism for applying said brake and then actuating said first mentioned means to pick up said pawls, and means operative upon the return of said wheels to zero for disengaging said first mentioned means from said pawls and then releasing said brake.

35. In combination, a counter having a plurality of number wheels and transfer mechanism for actuating the higher order wheels, resetting mechanism including pawls on said wheels and a cooperating reset shaft having means operative to pick up said pawls during resetting and return said wheels to zero, a counter drive having a brake therefor, means operative upon the initiation of operation of said resetting mechanism for applying said brake and then actuating said first mentioned means to pick up said pawls, means operative upon the return of said wheels to zero for disengaging said first mentioned means from said pawls and then releasing said brake, and friction clutch means in said counter drive for permitting resetting of said wheels while said drive remains braked and for also during counting restraining overthrow of said wheels upon sudden stopping of said drive.

36. In combination, a counter having a plurality of number wheels and transfer mechanism for actuating the higher order wheels, resetting mechanism including pawls on said wheels and a cooperating reset shaft having means operative to pick up said pawls during resetting and return said wheels to zero, a counter drive having a brake therefor, means operative upon the initiation of operation of said resetting mechanism for applying said brake and then actuating said first mentioned means to pick up said pawls, means operative upon the return of said wheels to zero for disengaging said first mentioned means from said pawls and then releasing said brake, and means operative upon operation of said resetting mechanism for preventing overthrow of said wheels during resetting and for also freeing said wheels for further counting upon their return to zero.

37. The combination with a counter having operatively connected number wheels and resetting mechanism operative to pick up said wheels and rotate the same together to zero position, of a counter drive having a driving wheel rotatable thereby during counting and rotatable in the same direction by said resetting mechanism when said number and driving wheels rotate together during resetting, means controlled by said resetting mechanism stopping the rotation of said driving wheel upon the completion of resetting, and means for thereafter releasing the same for the resumption of counting.

38. The combination with a counter having counter wheels, transfer mechanism for actuating the higher order wheels, resetting mechanism having a reset operating member movable in one direction to effect resetting and always resetting said wheels in the same direction, stop means operative to limit the movement of said wheels during resetting, and means operable upon the completion of resetting for automatically reversing said reset operating member and releasing said wheels.

39. The combination with a counter having operatively connected number wheels, and resetting mechanism having an axial reset shaft and co-operating pawls on said number wheels picked up thereby during resetting, of a reset operating member movable in one direction to effect resetting, stop means for stopping said wheels in zero position, and means automatically operable upon completion of resetting for insuring that said shaft will positively pick up all wheels about to assume zero position during the next resetting operation.

40. The combination with a counter having operatively connected counter wheels and reset mechanism, of a main reset member operatively connected to reset said counter, brake means operated by said reset member controlling the drive of said counter, and stop device means operated by said reset member for preventing overthrow of the counter wheels.

EDWARD A. SLYE.

CERTIFICATE OF CORRECTION.

Patent No. 2,264,557.  December 2, 1941.

EDWARD A. SLYE.

It is hereby certified that error appears in the printed specification of the above numbered patent requiring correction as follows: Page 10, second column, lines 4 and 5, claim 6, strike out the words "for returning said counting wheels to zero also" and insert the same before "driving" in line 4, same claim; and that the said Letters Patent should be read with this correction therein that the same may conform to the record of the case in the Patent Office.

Signed and sealed this 10th day of March, A. D. 1942.

(Seal)

Henry Van Arsdale,
Acting Commissioner of Patents.